US010096071B1

(12) United States Patent
Krakowiecki et al.

(10) Patent No.: US 10,096,071 B1
(45) Date of Patent: *Oct. 9, 2018

(54) SYSTEM AND METHOD FOR DATA MANAGEMENT AND FINANCIAL TRANSACTION CATEGORIZATION

(71) Applicant: Wells Fargo Bank, N.A., San Francisco, CA (US)

(72) Inventors: Matthew Krakowiecki, Denver, CO (US); Pearl Kolling, Oakland, CA (US); Jack Mackouse, Walnut Creek, CA (US); Kevin Rhein, Minnetonka, MN (US); Elizabeth Hoople, Walnut Creek, CA (US); Kathy Yee, Orinda, CA (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/252,371

(22) Filed: Apr. 14, 2014

Related U.S. Application Data

(63) Continuation of application No. 13/460,485, filed on Apr. 30, 2012, now Pat. No. 8,700,503, which is a
(Continued)

(51) Int. Cl.
*G06Q 40/00* (2012.01)
(52) U.S. Cl.
CPC .................................... *G06Q 40/12* (2013.12)
(58) Field of Classification Search
CPC ........ G06Q 40/10; G06Q 40/02; G06Q 40/00; G06Q 30/04; G06Q 20/10
(Continued)

(56) References Cited

U.S. PATENT DOCUMENTS

| 4,346,442 A | 8/1982 | Musmanno |
| 4,376,978 A | 3/1983 | Musmanno |

(Continued)

FOREIGN PATENT DOCUMENTS

| EP | 1 081 664 | 3/2001 |
| EP | 1 107 149 | 6/2001 |

(Continued)

OTHER PUBLICATIONS

U.S. Appl. No. 12/268,044, filed Nov. 10, 2008, Krakowiecki et al.
(Continued)

*Primary Examiner* — Garcia Ade
(74) *Attorney, Agent, or Firm* — Foley & Lardner LLP

(57) ABSTRACT

A transaction management system includes a database system configured to receive and store data for a plurality of financial transactions, the data for the plurality of financial transactions being associated with a plurality of financial accounts of a user. The system further includes a server system coupled to the database system and configured to categorize the plurality of financial transactions into a plurality of categories, the categories including merchant categories and payment method categories, the server system being further configured to provide a plurality of user interfaces to the user, each user interface providing a display of a different portion of the plurality of financial transactions, each user interface configured to enable a user to select a link configured to direct the user to an image of a check associated with one of the plurality of financial transactions; and categorize the financial transaction into a one of the merchant categories.

7 Claims, 18 Drawing Sheets

Related U.S. Application Data continuation of application No. 12/324,581, filed on Nov. 26, 2008, now Pat. No. 8,170,932.

(60) Provisional application No. 60/990,905, filed on Nov. 28, 2007.

(58) Field of Classification Search
USPC .......................................................... 705/30
See application file for complete search history.

(56) References Cited

U.S. PATENT DOCUMENTS

| | | | |
|---|---|---|---|
| 4,597,046 | A | 6/1986 | Musmanno et al. |
| 4,774,662 | A | 9/1988 | Ito et al. |
| 5,193,055 | A | 3/1993 | Brown et al. |
| 5,710,889 | A | 1/1998 | Clark et al. |
| 5,826,243 | A | 10/1998 | Musmanno et al. |
| 5,890,140 | A | 3/1999 | Clark et al. |
| 5,933,816 | A | 8/1999 | Zeanah et al. |
| 5,940,809 | A | 8/1999 | Musmanno et al. |
| 6,058,378 | A | 5/2000 | Clark et al. |
| 6,073,119 | A | 6/2000 | Bornemisza-Wahr et al. |
| 6,173,270 | B1 | 1/2001 | Cristofich et al. |
| 6,324,523 | B1 | 11/2001 | Killeen et al. |
| 6,332,126 | B1 | 12/2001 | Peirce et al. |
| 6,341,353 | B1 | 1/2002 | Herman et al. |
| 6,349,290 | B1 | 2/2002 | Horowitz et al. |
| 6,697,824 | B1 | 2/2004 | Bowman-Amuah |
| 7,451,134 | B2 | 11/2008 | Krakowiecki et al. |
| 8,660,950 | B2 * | 2/2014 | MacKouse ........................ 705/41 |
| 9,660,950 | B2 * | 5/2017 | Archibong ............. H04L 51/32 |
| 2002/0091635 | A1 | 7/2002 | Dilip et al. |
| 2002/0123949 | A1 | 9/2002 | Vanleeuwen |
| 2002/0198806 | A1 | 12/2002 | Blagg et al. |
| 2003/0004751 | A1 | 1/2003 | Ng et al. |
| 2003/0018550 | A1 | 1/2003 | Rotman et al. |
| 2003/0061132 | A1 | 3/2003 | Yu et al. |
| 2003/0097331 | A1 | 5/2003 | Cohen |
| 2003/0101131 | A1 | 5/2003 | Warren et al. |
| 2005/0240526 | A1 | 10/2005 | Hill |
| 2007/0244778 | A1 | 10/2007 | Bailard |
| 2008/0147523 | A1 | 6/2008 | Mulry et al. |
| 2009/0263004 | A1 * | 10/2009 | Hawkins ................. G06Q 20/04 382/139 |
| 2010/0306111 | A1 * | 12/2010 | Slater ..................... G06Q 20/04 705/45 |

FOREIGN PATENT DOCUMENTS

| | | |
|---|---|---|
| EP | 1 143 362 | 10/2001 |
| WO | WO-02/099576 | 12/2002 |

OTHER PUBLICATIONS

U.S. Appl. No. 12/324,637, filed Nov. 26, 2008, Krakowiecki et al.
Final Office Action on U.S. Appl. No. 13/460,485, dated Jun. 19, 2013, 18 pages.
Gaizauskas, et al. Coupling Information Retrieval and Information Extraction: A New Text Technology for Gathering Information from the Web. 1997. Proceedings of RIAO 97: computer-Assisted Information Searching on the Internet. Montreal, Canada, 15 pages.
http:///web.intuit.com/support/quicken/2000/mac/2226.html. Reconciling Online Bank Accounts, last modified Jul. 25, 2003, 2 pages.
http://www.fremontbank.com/personal_banking/pam/pam.htm. Personal Account Manager, filed in U.S. Appl. No. 12/324,637 on Mar. 16, 2009, 2 pages.
http://www.wellsfargo.com Account Management, filed in U.S. Appl. No. 12/324,637 on Mar. 16, 2009, 2 pages.
Non-Final Office Action on U.S. Appl. No. 13/460,48, dated Dec. 17, 2012, 13 pages.
Non-Final Office Action on U.S. Appl. 13/619,901, dated Mar. 18, 2013, 9 pages.
Notice of Allowance on U.S. Appl. No. 13/460,485, dated Nov. 25, 2013, 12 pages.
Notice of Allowance on U.S. Appl. No. 13/619,901, dated Aug. 23, 2013, 8 pages.
Notice of Allowance on U.S. Appl. No. 12/324,581, dated Dec. 30, 2011, 9 pages.
Office Action on U.S. Appl. No. 12/324,581, dated Dec. 10, 2010, 11 pages.
Office Action on U.S. Appl. No. 12/324,581, dated May 24, 2011, 13 pages.

* cited by examiner

WELLS FARGO

Home | Help Center | Contact Us | Locations | Site Map | Apply | Sign Off

Account Summary ← 610  Last Log On:July 13, 2004

- Account Summary
- Brokerage
- Bill Pay
- Transfer
- Account Services
- My Message Center

Ready to invest?
Call Wells Fargo Investments.
LEARN MORE

Get a Wells Fargo Student Loan
Rates have never been lower-starting at 2.77%
Learn More

| Wells Fargo Accounts | OneLook Accounts |
|---|---|

Enroll for Online Statements | Check Out More New Features      My Message Center

Cash Accounts

| Account | Account Number | Available Balance |
|---|---|---|
| CHECKING | 002-4001xxx | $5,000.00 |
| CHECKING | 002-4002xxx | $5,000.00 |
| NAT TF MMA  -Not FDIC Insured-No Bank Gaurantee-May Lose Value | 002-4005xxx | $6,000.00 |
| MRS | 002-4004xxx | $7,011.27 |
| SAVINGS | 002-4003xxx | $6,008.22 |
| Total | | $31,019.49 |

Investment Accounts

| Account | Account Number | Total Account Value |
|---|---|---|
| RETIREMENT TIME ACCOUNT | 002400xxx | $3,000.00 |
| TIME ACCOUNT | 002400xxx | $90,000.00 |
| BROKERAGE  -Not FDIC Insured-No Bank Gaurantee-May Lose Value | W674xxx10 | $0.00 |
| Total | | $93,000.00 |

Credit Accounts ← 611

| Account | Account Number | Outstanding Balance | Available Credit |
|---|---|---|---|
| HOME EQUITY LINE OF CREDIT | 071-3300xxx | $0.00 | $250,000.00 |
| MASTERCARD  View Spending Report | 5490-8401-0423-xxxx | $934.21 | $4,265.79 |
| ±SMARTFIT HOME EQUITY ACCOUNT | 076-3302xxx-1998 | $0.00 | $0.00 |
| ±SMARTFIT HOME EQUITY ACCOUNT | 076-3302xxx-1998 | $0.00 | $0.00 |
| Total | | $0.00 | $250,000.00 |

Loan Accounts

| Account | Account Number | Outstanding Principal Balance |
|---|---|---|
| PERSONAL LOAN SECURED | 002-3306xxx | $10,000.00 |
| MORTGAGE | 1078xxx | $62,170.42 |
| ±STUDENT LOAN | 37214xxx | $5,000.00 |

*FIG. 7A*

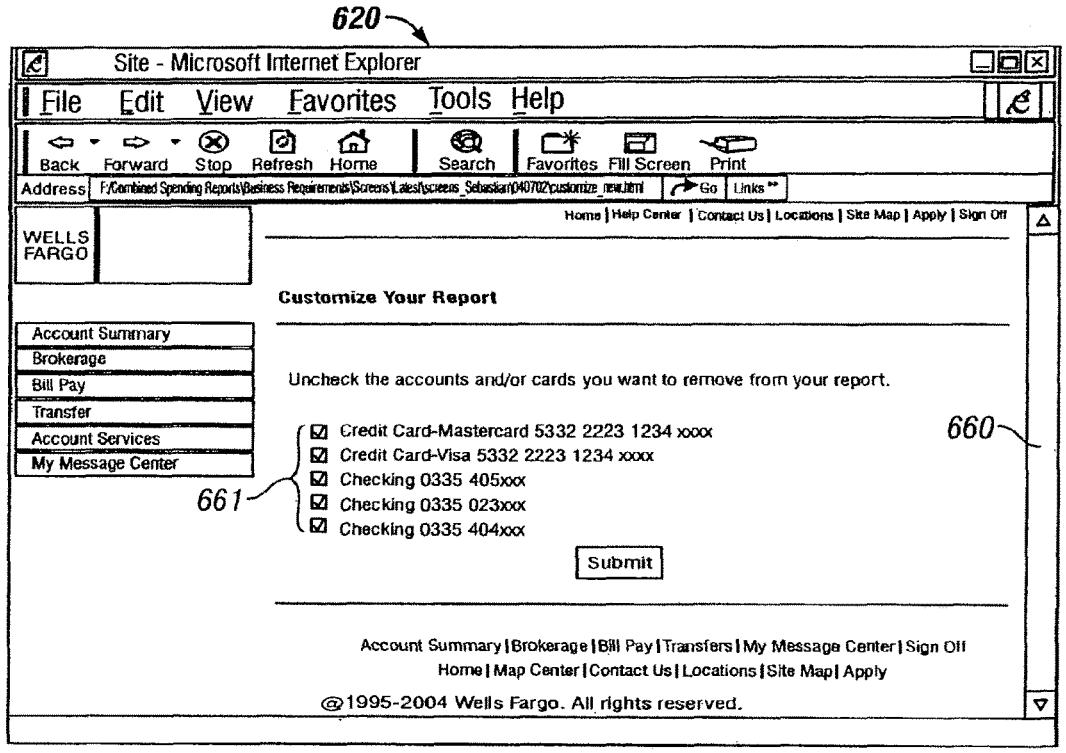
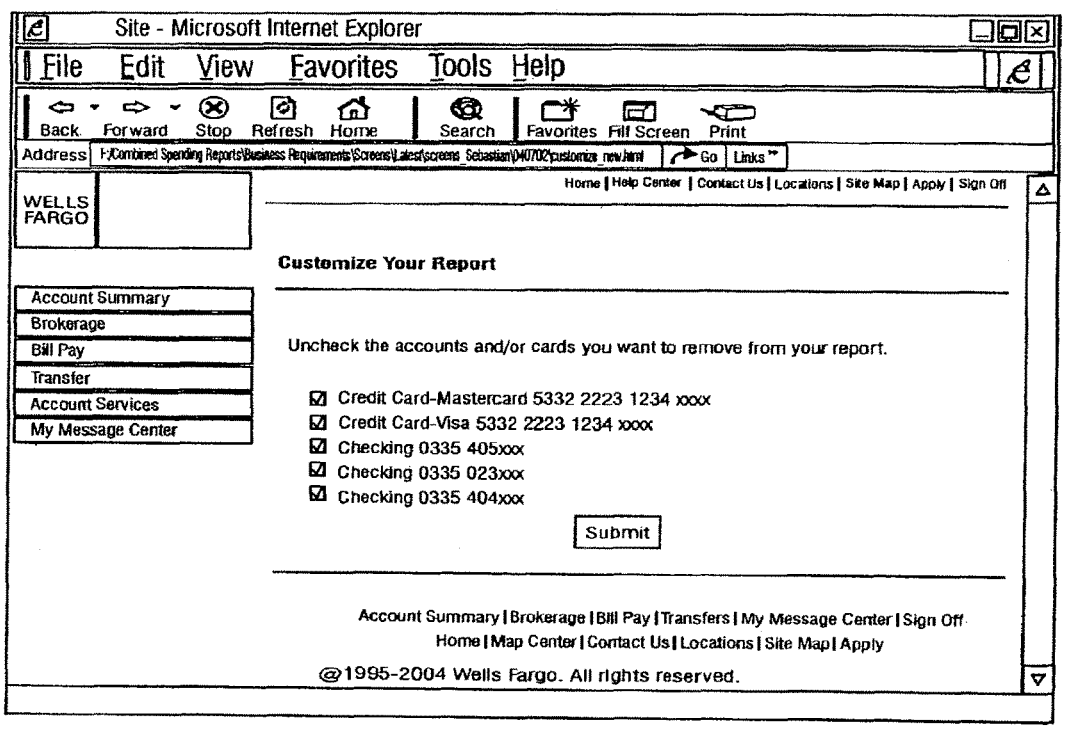
FIG. 7C

620

My Spending Report

| Spending Summary | Credit Cards | Check Cards | Other Checking Activity | Bill Pay |

Household / Services / Utilities - Check Cards
<Back to Previous Page
Click on column heading to sort July 2004

| Posting Date | Location | Description | Eligible for Rewards? | Amount | Payment Method |
|---|---|---|---|---|---|
| 07/08/04 | ---- | CHECK CRD PURCHASE 08/22 OceanViewSA Luxembourg LU 432374XXXXXX5410 238404107116541 ?MCC=7995 0910000190A | YES | $40.00 | Krishna checking 322 322-8422xxx |
| 07/08/04 | ---- | CHECK CRD PURCHASE 08/23 OceanViewSA Luxembourg LU 432374XXXXXX7822 238404107116844 ?MCC=7995 0910000190A | YES | $50.00 | Krishna checking 322 322-8422xxx |
| 07/08/04 | ---- | CHECK CRD PURCHASE 08/24 FEDEX SHP 08/19/04 AB# 828-423641291 TN 491988XXXXX6001 238404103555216 ? MCC=7995 0910000190A | YES | $63.00 | Krishna checking 397 397-1065xxx |
| 07/08/04 | ---- | CHECK CRD PURCHASE 08/23 OceanViewSA Luxembourg LU 432374XXXXXX7622 238404107116637 ?MCC=7995 0910000190A | YES | $20.00 | Krishna checking 322 322-8422xxx |
| 07/08/04 | ---- | CHECK CRD PURCHASE 08/23 WWW.INEXIA.COM++OF 432374XXXXXX5410 238404107119538 ?MCC=7995 0910000190A | YES | $30.00 | Krishna checking 322 322-8422xxx |
| 07/08/04 | ---- | CHECK CRD PURCHASE 08/24 FEDEX SHP 08/19/04 AB# 828-423641291 TN 491988XXXXX6001 238404103555216 ? MCC=7995 0910000190A | YES | $18.00 | Krishna checking 397 397-1065xxx |
| 07/08/04 | ---- | CHECK CRD PURCHASE 08/24 GOOGLE *ADORDS 650-623-4000 CA 432374XXXXXX0541 239404105013203 ? MCC=7311 0910000190A | YES | $527.00 | Krishna checking 397 397-1065xxx |
| 07/08/04 | ---- | CHECK CRD PURCHASE 08/22 KANOODLE.COM, INC 716-691758 NY 432374XXXXXX0541 238404104818891 ? MCC=7311 0910000190A | YES | $100.00 | Krishna checking 397 397-1065xxx |
| Sub Total Household / Services / Utilities | | | | $649.95 | |

<Back to Previous Page

Print this page only or print all pages
Save as PDF this page only or save all pages.

650

630

Need more information about these features? Read our Frequently Asked Questions

1 You can earn rewards points on your purchases if you are enrolled in one of Wells Fargo's optional rewards programs for our Wells Fargo Check Card or Credit Card. You must enroll for the rewards program separately. If you are not already enrolled in one of our rewards programs, click here to sign-up today. Once enrolled in a rewards program, you will need to keep your account open and in good standing in order to earn points.

Form more information regarding your Checking Account and Check Card – call 1-800-TO-WELLS (For Portfolio Management Account SM (PMA) customers, call 1-800-742-4932).
Access additional management & planning tools from Wells Fargo.

Account Summary | Brokerage | Bill Pay | Transfers | My Message Center | Sign Off
Home | Map Center | Contact Us | Locations | Site Map | Apply
@1995-2004 Wells Fargo. All rights reserved.

1050 — My Spending Report screen

Tabs: Account Summary | Account Activity | My Spending Report | Statements & Documents — 1068

My Spending Report   {Try it!} Helpful Budget Tips   [?] Help

Next Steps
- My Budget Plan — 1072
- Take a Tour
- Tools and Calculators — 1074

✓ Transaction(s) Successfully categorized
Spending summary as of 1/15/07 - All Payment Methods     1062   1070

Show [Spending Summary ▼] [Go]   Hide Categories with $0.00   1060   View More Spending

1052 — Click on the column heading to start   1056   1058

| Category A | JAN to Date | DEC | NOV | 12-Month Avg |
|---|---|---|---|---|
| Airlines / Transportation | $0.00 | $0.00 | $0.00 | $0.00 |
| Auto / Gas | $0.00 | $0.00 | $0.00 | $0.00 |
| Building Supply / Wholesale | $0.00 | $0.00 | $0.00 | $0.00 |
| Charity / Community Org. | $0.00 | $0.00 | $0.00 | $0.00 |
| Contractor / Business Services 1066 | $0.00 | $0.00 | $0.00 | $0.00 |
| Education | $0.00 | $0.00 | $0.00 | $0.00 |
| Entertainment | $0.00 | $0.00 | $0.00 | $0.00 |
| Groceries | $0.00 | $0.00 | $0.00 | $0.00 |
| Healthcare / Pharmacy | $0.00 | $0.00 | $0.00 | $0.00 |
| Household | $0.00 | $0.00 | $0.00 | $0.00 |
| Insurance / Financial Services | $0.00 | $0.00 | $0.00 | $0.00 |
| Lodging | $0.00 | $0.00 | $0.00 | $0.00 |
| Office Supply / Stationary | $0.00 | $0.00 | $0.00 | $0.00 |
| Personal Services | $0.00 | $0.00 | $0.00 | $0.00 |
| Pet / Veterinary | $0.00 | $0.00 | $0.00 | $0.00 |
| Postage / Delivery | $0.00 | $0.00 | $0.00 | $0.00 |
| Restaurants | $0.00 | $0.00 | $0.00 | $0.00 |
| Retail / Department Stores | $0.00 | $0.00 | $0.00 | $0.00 |
| Utilities / Telecom | $0.00 | $0.00 | $0.00 | $0.00 |

1076 — Ads:
- Erase High Interest Debt — Consolidate bills with a personal loan. Apply Now ▶
- No Down Payment? Learn how to buy with little or no money down. Download Free Guide ▶

Non-Categorized Transactions (We are unable to assign these transactions to a category above)

1054 — [Categorize Now] — 1064

| | JAN to Date | DEC | NOV | 12-Month Avg |
|---|---|---|---|---|
| ATM Withdrawals | $0.00 | $0.00 | $0.00 | $0.00 |
| Cash Advances Item Credit Cards | $0.00 | $0.00 | $0.00 | $0.00 |
| Checks Written[2] | $0.00 | $0.00 | $0.00 | $0.00 |
| Electronic Payments from Checking[1] | $0.00 | $0.00 | $0.00 | $0.00 |
| Non-Card Withdrawals from Checking | $0.00 | $0.00 | $0.00 | $0.00 |
| Non-Categorized Check Card Transactions | $0.00 | $0.00 | $0.00 | $0.00 |
| Non-Categorized Credit Card Transactions | $0.00 | $0.00 | $0.00 | $0.00 |
| Non-Categorized Online Item Pay Payments | $0.00 | $0.00 | $0.00 | $0.00 |

What's Next?

```
                                                                      1100
┌─────────────────────────────────────────────────────────────────────┐
│ Accounts │ Bill Pay │ Transfers │ Brokerage │ Account Services │ Messages & Alerts │
│ Account Summary │ Account Activity │ My Spending Report │ Statements & Documents │
│                                                                     │
│ Categorize Transactions : Step 1                              [?]Help│
│                                                                     │
│ [⊠] You must choose at least one month to categorize                │
│ [ Please select the month(s) you want to categorize ]               │
│                                                                     │
│   □  February 2007                                                  │
│   □  January 2007                                                   │
│   □  December 2006     1102                                         │
│                                                           1104      │
│                                                    [Cancel] [Continue]│
└─────────────────────────────────────────────────────────────────────┘
```

FIG. 15

```
                                                                      1150
┌─────────────────────────────────────────────────────────────────────┐
│         │      [ Product Search ]   Sign Off | Home | Locations | Contact Us | Open Account │
│  BANK   │                                                           │
│         │                                         🔒 Online Security Guarantee │
│ Accounts │ Bill Pay │ Transfers │ Brokerage │ Account Services │ Messages & Alerts │
│ Account Summary │ Account Activity │ My Spending Report │ Statements & Documents │
│                                                                     │
│ Categorize Transactions : Step 2                              [?]Help│
│                                                                     │
│ Using the dropdown menus below, select how you want to categorize one or more of the transactions below. After selecting all the transactions you want to │
│ categorize, click the Submit button to update.                      │
│ <Previous|Next>                                                     │
│ Click the column heading to start    1156                      1154 │
│ Posting Date ▽  Description           Payment Method   Amount   Category │
│ ┌─────────────────────────────────────────────────────────────────┐│
│ │ 11/15/06   Check #110 View          Checking 1234-XXX  $105.00  Check Written    ▽ ││
│ │ 11/11/05   Non-Categorized Online Bill Pay  Checking 1234-XXX  $195.00  Non-Cat Bill Pay  ▽ ││
│1152│ 11/08/05   Non-Categorized Check Card     Checking 1234-XXX  $95.25   Non-Cat Check Card ▽ ││
│ │ 11/05/05   Non-Categorized Credit Card    Visa XXX-XXXX-XXXX 1234  $64.75   Non-Cat Credit Card ▽ ││
│ │ 11/05/05   Check #111 View          Checking 1234-XXX  $54.75   Checks Written   ▽ ││
│ └─────────────────────────────────────────────────────────────────┘│
│ <Previous|Next>                                              1158   │
│                                               [Cancel] [Back] [Submit]│
└─────────────────────────────────────────────────────────────────────┘
```

Accounts | Bill Pay | Transfers | Brokerage | Account Services | Messages & Alerts
Account Summary | Account Activity | My Spending Report | Statements & Documents

Categorize Transactions    ？Help

Using the dropform menus below, select how you want to categorize one more of the transactions below. After selecting all the transactions you want to categorize, click the Submit button to update.

< Back to Previous Page >

Click the column heading to start — 1256    1258    1260    1262  1264

| Posted Date ▽ | Description — 1266 | Payment Method | Amount | Category |
|---|---|---|---|---|
| 1/23/07 | Check #110 View | Checking 1234-XXX | $81.71 | Auto / Gas - Edits ▽ |
| 01/15/05 | CHEVERON 00093591 REDWOOD CITY CA | Visa XXX-XXXX-XXX 1234 | $39.52 | Auto / Gas - Edits ▽ |
| 01/10/05 | UNION 76 18345103 SAN FRANCISCO CA | Visa XXX-XXXX-XXX 1234 | $65.20 | Auto / Gas - Edits ▽ |
| 01/05/05 | UNION 76 09521421 SAN FRANCISCO CA | Visa XXX-XXXX-XXX 1234 | $19.44 | Auto / Gas - Edits ▽ |

< Previous | Next >

1268

Cancel | Submit 1254, 1252

Accounts | Bill Pay | Transfers | Brokerage | Account Services | Messages & Alerts
Account Summary | Account Activity | My Spending Report | Statements & Documents

Edit Transactions Details    ？Help

Under the Category column heading, use the dropdown menu to select the new category for this transaction. Click the Submit button to update.

Return to Transaction List 1304  1306  1316  1308  1310  1312  1314

| Posted Date | Description | Payment Method | Amount | Category |
|---|---|---|---|---|
| 1/23/07 | Check #110 View | Checking 1234-XXX | $91.71 | Auto / Gas ▽ |

1302

Cancel | Submit

1318

SYSTEM AND METHOD FOR DATA MANAGEMENT AND FINANCIAL TRANSACTION CATEGORIZATION

CROSS-REFERENCE TO RELATED PATENT APPLICATIONS

This application is a continuation of U.S. application Ser. No. 13/460,485, filed Apr. 30, 2012, which is a continuation of U.S. application Ser. No. 12/324,581, filed Nov. 26, 2008, now U.S. Pat. No. 8,170,932, which claims the benefit of U.S. Provisional Application No. 60/990,905, filed Nov. 28, 2007. All of these applications are incorporated by reference herein in their entireties.

TECHNICAL FIELD

This disclosure relates generally to the field of network-based communications. More particularly, this disclosure relates to a method and apparatus for facilitating data management over a network, such as the Internet.

BACKGROUND

The explosive growth of the Internet as a publication and interactive communication platform has created an electronic environment that is changing the way business is transacted. As the Internet becomes increasingly accessible around the world, online communications and business transactions increase exponentially.

Several attempts have been made to facilitate online management of financial data using such network-based communications, namely to provide software packages residing on a computer and configured, for example, to acquire data from network-based financial transaction facilities, and to facilitate organization and management of such data over the network. However, such packages do not provide a satisfactory level of data access and/or detail. For example, many of the current software applications rely on preparation and display of transaction lists, such as credit card monthly statements and/or bank account statements, but do not provide a system to organize such transactions. Other software applications allow categorization of transactions, but require user input and data downloading prior to such user-defined operations. Thus, what is needed is a method and apparatus that facilitate real-time data retrieval, organization, and management over a network, such as the Internet.

SUMMARY

One embodiment relates to a transaction management system, comprising a database system configured to receive and store data for a plurality of financial transactions, the data for the plurality of financial transactions being associated with a plurality of financial accounts of a user; and a server system coupled to the database system and configured to categorize the plurality of financial transactions into a plurality of categories, the categories including merchant categories and payment method categories, the server system being further configured to provide a plurality of user interfaces to the user, each user interface providing a display of a different portion of the plurality of financial transactions, each user interface configured to enable a user to select a link configured to direct the user to an image of a check associated with one of the plurality of financial transactions; and categorize at least one of the plurality of financial transactions into a new category.

Another embodiment relates to a computer-implemented transaction management system, the system comprising a processor and program logic stored in memory and executable by the processor, the program logic comprising account management logic configured to manage bank accounts respectively associated with a plurality of account holders at a bank, the account management logic configured to process transactions for the bank accounts, the transactions including credit card transactions and check transactions; and interface logic configured to connect the transaction management system to computer systems associated with the plurality of account holders by way of the Internet, the interface logic providing the plurality of account holders with web access to an on-line banking area of the bank, the interface logic further configured to provide a display of a plurality of categories including merchant categories and payment method categories, wherein the transactions are categorized into the plurality of categories; provide a first link selectable to enable an account holder to categorize at least one of the transactions; and provide the account holder with at least one second link selectable to direct the account holder to additional data regarding resources available through the bank, the at least one second link being provided by the interface logic from a plurality of available links, the at least one second link being provided based on at least one customization criteria.

Another embodiment relates to a method of managing financial data, comprising managing bank accounts respectively associated with a plurality of account holders for a bank, including processing transactions for the bank accounts, the transactions including at least credit card transactions and checking transactions; storing data for the transactions in a computer-implemented storage device; categorizing the transactions into a plurality of categories based on the data, the plurality of categories including at least merchant categories and payment method categories; establishing a connection with one of the account holders via the Internet, including providing the account holder with web access to an on-line banking area of a website of the bank; providing a first display of at least a portion of the plurality of categories to the account holder, wherein for each displayed category, the first display includes a category description, a current cash flow amount, and an average cash flow amount calculated over a time period, the time period being configurable by the account holder, wherein the first display is customizable by the account holder to define the portion of the plurality of categories to be displayed; receiving a first input from the account holder; responsive to the first input, providing a second display of a check image associated with one of the transactions; receiving a second input from the account holder categorizing the transaction into one of the merchant categories; and responsive to the second input, updating the first display to reflect the categorization of the transaction.

BRIEF DESCRIPTION OF THE DRAWINGS

FIGS. 7A through 7D illustrate exemplary interfaces for facilitating data management according to an exemplary embodiment;

FIGS. 13-19 illustrate user interfaces according to various exemplary embodiments.

DETAILED DESCRIPTION OF EXEMPLARY EMBODIMENTS

Figure 1:
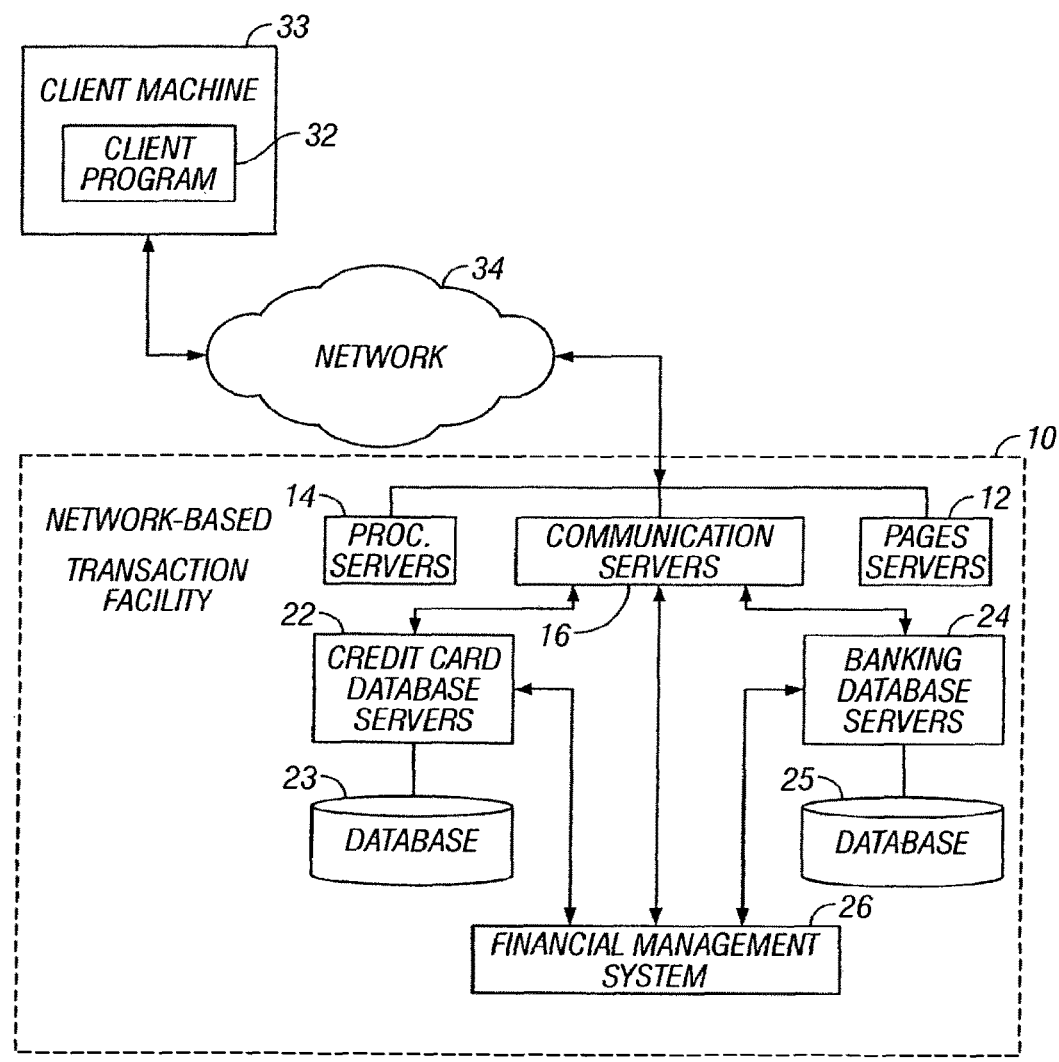
FIG. 1 is a block diagram illustrating an exemplary network-based transaction and communications facility, which facilitates data management according an exemplary embodiment.

FIG. 1 is a block diagram illustrating an exemplary network-based transaction and communications facility 10, such as, for example, a financial transaction facility or system, which facilitates transactions and communications with users and further facilitates data management. While an exemplary embodiment is described within the context of a financial transaction and communications facility 10, it will be appreciated by those skilled in the art that the embodiments disclosed herein will find application in many different types of computer-based, and network-based, commerce facilities.

The facility 10 includes one or more of a number of types of front-end Web servers, namely, for example, pages servers 12, which deliver Web pages to multiple users, for example markup language documents, and processing servers 14, such as, for example, Common Gateway Interface (CGI) servers or Internet Server Application Program Interface (ISAPI) servers, which provide an intelligent interface to the back-end of the facility 10. In addition, the facility 10 may include communication servers 16 that provide, inter alia, automated communications, such as, for example, electronic mail (email) communications to/from users, and/or instant messaging (IM) functionality, to/from users of the facility 10.

The facility 10 further includes one or more back-end servers, for example, a credit card database server 22, a banking database server 24, each of which maintains and facilitates access to a respective database 23, 25 and a data management system, such as, for example, a financial management system 26, which will be described in further detail below.

The network-based facility 10 may be accessed by a client program 32, such as a browser, for example the Internet Explorer browser distributed by Microsoft Corporation of Redmond, Wash., which executes on a client machine 33 and accesses the facility 10 via a network 34, such as, for example, the Internet. Other examples of networks that a client may use to access the facility 10 include a wide area network (WAN), a local area network (LAN), a wireless network, e.g. a cellular network, or other known networks.

Figure 2:
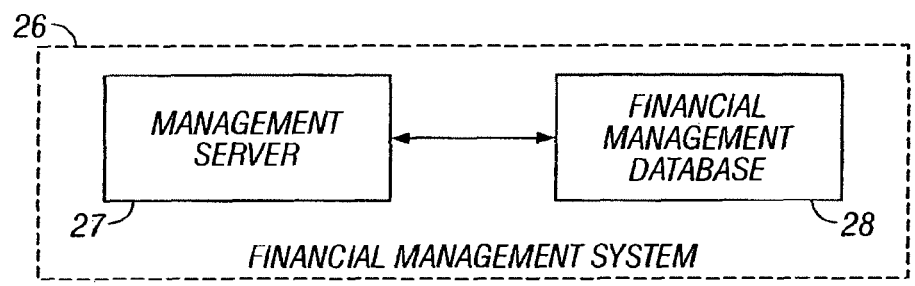
FIG. 2 is a block diagram illustrating a data management system within the network-based transaction and communications facility according to an exemplary embodiment.

FIG. 2 is a block diagram illustrating a data management system within the network-based transaction and communications facility according to an exemplary embodiment. As illustrated in FIG. 2, in one embodiment, the financial management system 26 includes one or more back-end management servers, of which management server 27 is shown, which maintain and facilitate access to a financial management database 28. The management server 27 and the database 28 at least partially implement and support the network-based facility 10 and are specifically provided to enable an exemplary embodiment, as described in further detail below.

Figure 3:
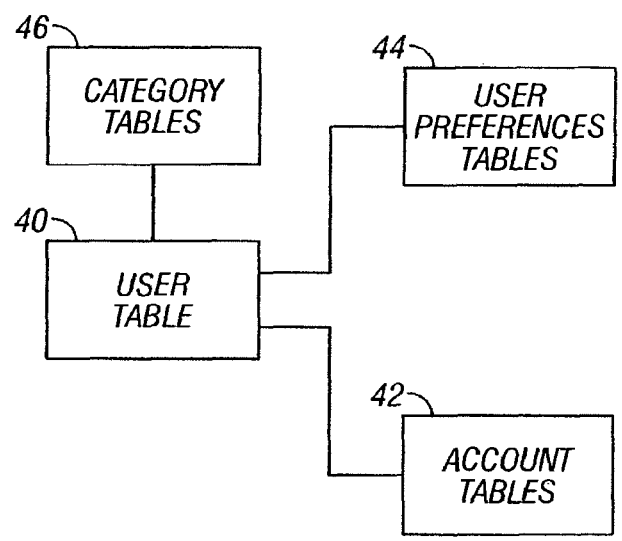
FIG. 3 is a block diagram illustrating a management database, maintained by and accessed via a processing server within the data management system, which at least partially implements and supports the data management system according to an exemplary embodiment.

FIG. 3 is a block diagram illustrating a management database 28, maintained by and accessed via management server 27 within the data management system 26, according to an exemplary embodiment. The database 28 may, in one embodiment, be implemented as a relational database, and includes a number of tables having entries, or records, that are linked by indices and keys. In an alternative embodiment, the database 28 may be implemented as a collection of objects in an object-oriented database.

Central to the database 28 shown in FIG. 3 is a user table 40, which contains records for each entity or user of the facility 10. The database 28 also includes an accounts table 42, which may be linked to the user table 40 and may be populated with account information and data related to each user of the network-based facility 10.

The database 28 may include a number of other tables, which may also be shown to be linked to the user table 40, for example, tables specifically provided to enable an exemplary embodiment. One or more category tables 46 are configured to store multiple categories and respective category codes used to organize financial transactions associated with each user, as described in further detail below. In one embodiment, the stored categories include, for example, lodging, airlines, auto rental, restaurants, education, services, health care, gas/auto, retail, groceries, other travel/entertainment, other credit card transactions, ATM withdrawals, cash advances, checks written, electronic payments from checking account, transfers of funds, non-card withdrawals from the checking account, and other non-categorized online bill payment transactions. Alternatively, other categories related to financial transactions associated with a user may be stored in the category tables 46.

In one embodiment, user-generated access preferences, such as, for example a data access indicator, which indicates whether the user has access to data provided by the financial management system 26, and/or user-generated communication preferences, such as, for example, an email preference, which indicates whether the user has email notification privileges are stored in a user database within the transaction facility 10, such as, for example, in the banking database 25. All the above preferences are part of a user profile constructed and stored for each user. In an alternate embodiment, the user-generated access preferences and/or the user-generated communication preferences may be stored in one or more user preferences tables 44 within the financial management database 28.

In some embodiments, prior to any communication between client 32 and the network-based facility 10, data related to financial transactions associated with each user are retrieved from respective databases maintained and accessed by the credit card database servers 22 and the banking database servers 24.

Figure 4:
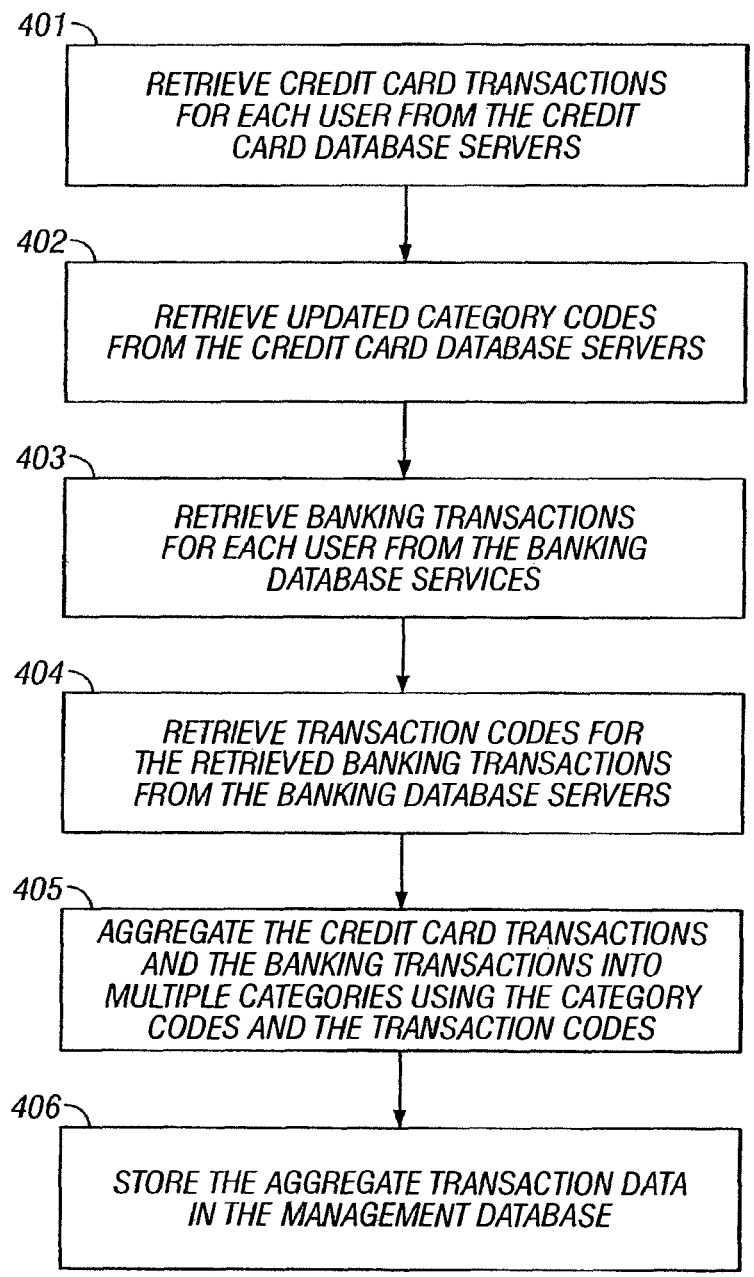
FIG. 4 is a flow diagram illustrating a method for aggregating data according to an exemplary embodiment.

FIG. 4 is a flow diagram illustrating a method for aggregating data according to an exemplary embodiment. As illustrated in FIG. 4, at processing block 401, credit card transactions are retrieved for each user from the credit card database servers 22. In one embodiment, the management server 27 requests data related to credit card transactions associated with each user of the facility 10, the credit card transactions being stored in the database 23 associated with the credit card database servers 22. The credit card database servers 22 retrieve the credit card transactions and transmit the related data to the management server 27. Each credit card transaction datum includes, for example, a description of the transaction, the amount of the transaction, the location and date of the transaction, a predetermined credit card transaction code, and other data pertinent to the specific transaction. In an alternate embodiment, the retrieval of credit card transactions information may be performed in real-time during communications between the client 32 and the network-based facility 10.

At processing block 402, updated category codes are retrieved from the credit card database servers 22. In one embodiment, the management server 27 requests the updated category codes from the credit card database servers 22, such as, for example, merchant category codes defined by a merchant segmentation operation. The credit card database servers 22 retrieve the updated category codes from the associated database 23 and transmit the retrieved category codes to the management server 27. In one embodiment, each retrieved category code corresponds to a category used in subsequent aggregation and management of data. In an alternate embodiment, the retrieval of updated category code information may be performed in real-time during communications between the client 32 and the network-based facility 10.

At processing block 403, banking transactions are retrieved for each user from the banking database servers 24. In one embodiment, the management server 27 requests data related to banking transactions associated with each user of the facility 10, the banking transactions being stored in the database 25 associated with the banking database servers 24. The banking database servers 24 retrieve the banking transactions and transmit the related data to the management server 27. In one embodiment, the retrieved banking transactions include, for example, debit account transactions, ATM transactions, check transactions, fund transfer transactions, non-card withdrawal transactions, and other transactions related to bank accounts owned by each user of the facility 10. In an alternate embodiment, the retrieved banking transactions include electronic bill payment transactions associated with each user and stored in the respective database 25. In another alternate embodiment, the retrieval of banking transactions information may be performed in real-time during communications between the client 32 and the network-based facility 10.

At processing block 404, transaction codes for the requested banking transactions are retrieved from the banking database servers 24. In one embodiment, the management server 27 requests the transaction codes associated with the banking transactions from the banking database servers 24. The banking database servers 24 retrieve the transaction codes and transmit the codes to the management server 27. In one embodiment, each banking transaction performed for a user account has an associated banking transaction code, which identifies the particular banking transaction. In an alternate embodiment, the retrieval of the transaction codes may be performed in real-time during communications between the client 32 and the network-based facility 10.

At processing block 405, the data related to the credit card transactions and the data related to the banking transactions are aggregated and organized into multiple categories using the retrieved category codes and transaction codes. In one embodiment, the management server 27 aggregates the retrieved data and organizes data based on the categories stored in the category tables 46.

At processing block 406, the aggregate transaction data are stored in the financial management database 28. In one embodiment, the management server 27 stores the aggregate transaction data into the account tables 44 within the database 28.

According to an exemplary embodiment, the retrieval and processing of data related to financial transactions of each user are performed prior to any communication between client 32 and the network-based facility 10. The management server 27 retrieves financial transaction information performed during a predetermined period of time, for example credit card transactions and banking transactions performed within the previous sixty days. Alternatively, the management server 27 may retrieve financial transaction information performed within any predetermined amount of time. In an alternate embodiment, subsequent to the initiation of communications between the client 32 and the network-based facility 10, the retrieval and processing of data related to financial transactions of each user are performed in real-time, allowing each user to access the updated data in real-time.

Figure 5:
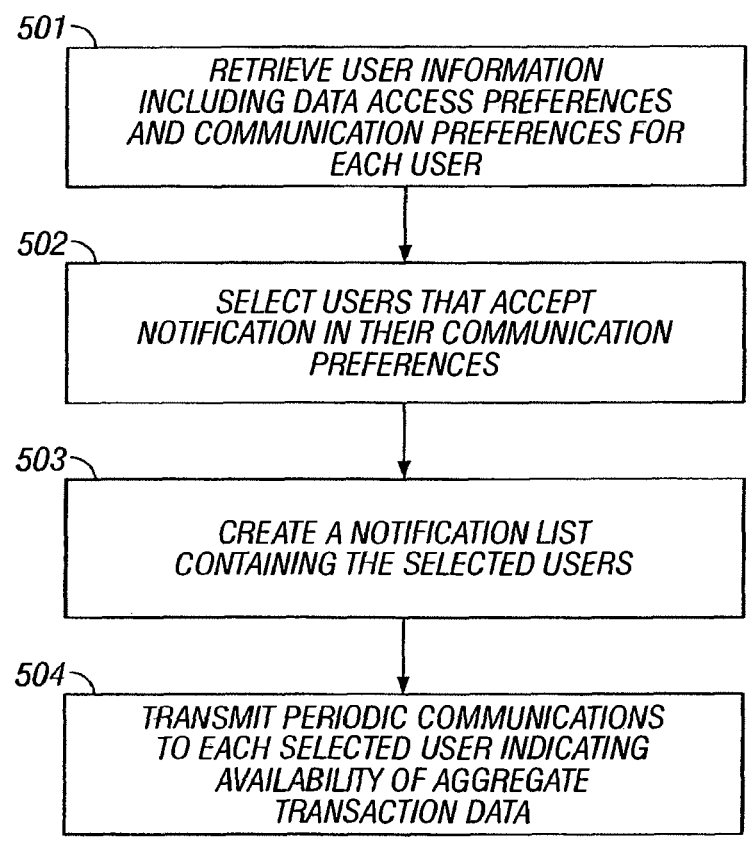
FIG. 5 is a flow diagram illustrating a method for transmitting communications to users indicating availability of aggregate data according to an exemplary embodiment.

According to an exemplary embodiment, electronic communications are exchanged between the facility 10 and the client 32 to indicate to each user the availability of the aggregate transaction data, as described in further detail below. FIG. 5 is a flow diagram illustrating a method for transmitting communications to users indicating availability of aggregate transaction data, according to an exemplary embodiment of the invention. As illustrated in FIG. 5, at processing block 501, user information including data access preferences and communication preferences for each user are retrieved from the database 25, or, in the alternative, from the management database 28. In one embodiment, the banking database servers 24 access the database 25 and retrieve user information, data access preferences and communication preferences associated with each user.

At processing block 502, users that have not opted out of communications indicating availability of aggregate transaction data and, thus, accept electronic notifications as a communication preference are selected. In one embodiment, the banking database servers 24 select only users that have not opted out of receipt of electronic notifications indicating the availability of aggregate transaction data.

At processing block 503, in one embodiment, the banking database servers 24 create a notification list containing the selected users. Finally, at processing block 504, periodic communications are transmitted to each selected user indicating the availability of aggregate transaction data. In one embodiment, the banking database servers 24 initiate an electronic communication with the client 32 via the communication servers 16 and transmit an email to each selected user indicating the availability of aggregate transaction data. Alternatively, the banking database servers 24 may initiate periodic communications with the client 32 via the communication servers 16 and transmit notifications related to the aggregate transaction data, such as, for example, periodic reminders of data updates or any other types of user notifications.

Figure 6:
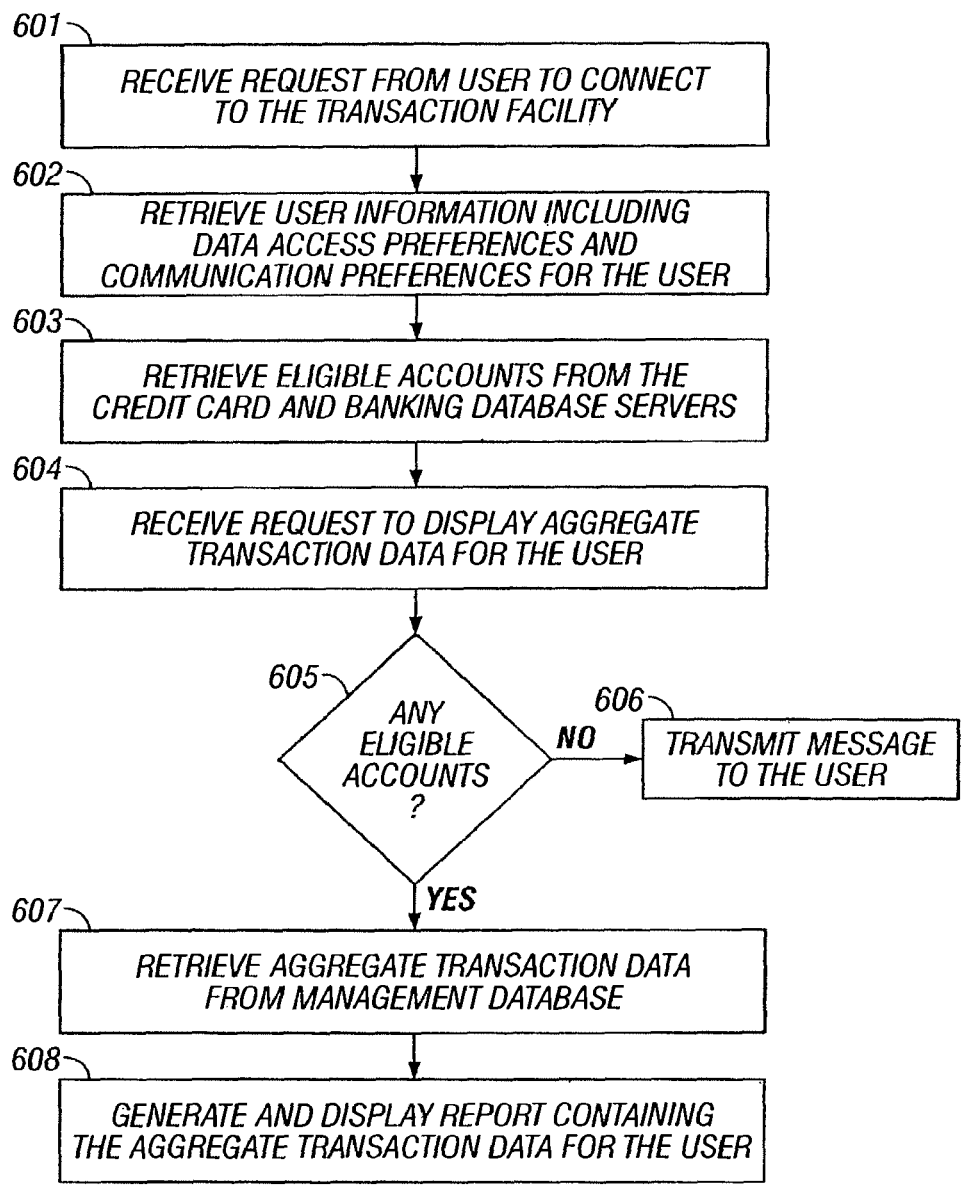
FIG. 6 is a flow diagram illustrating a method for facilitating data management according to an exemplary embodiment of the invention.

FIG. 6 is a flow diagram illustrating a method for facilitating data management according to an exemplary embodiment. As illustrated in FIG. 6, at processing block 601, a request to connect to the network-based transaction and communications facility 10 is received from a user. In one embodiment, the user initiates a communication with the facility 10 via the client 32 and the communication servers 16 and transmits a request to connect to the facility 10 through an authentication or login procedure.

At processing block 602, user information including data access preferences and communication preferences for each user are retrieved from the database 25 or, in the alternative, from the management database 28. In one embodiment, the banking database servers 24 access the database 25 and retrieve user information, data access preferences, and communication preferences associated with each user. Alternatively, the management server 27 accesses the database 28 and retrieves user information from the user table 40 and data access preferences and communication preferences associated with each user from the user preferences tables 44. The data access preferences indicate whether the user has access to data provided by the financial management system 26. If the user does not have access to data, the management server 27 transmits a message in a message window to the client 32 via the communication servers 16 and the network 34 and denies access to the data.

Otherwise, at processing block 603, eligible accounts associated with the user are retrieved from the databases 23, 25 associated with the credit card database servers 22 and the banking database servers 24, respectively. In one embodiment, subsequent to the receipt of the request to connect to the facility 10, the management server 27 communicates with the credit card database servers 22 and the banking database servers 24 and requests the financial accounts eligible for the data management operations. The respective servers 22 and 24 retrieve corresponding credit card accounts and banking accounts associated with the user and transmit the account information to the management server 27.

At processing block 604, a request to display aggregate transaction data in real-time is received from a user. In one embodiment, the user initiates a communication with the facility 10 via the client 32 and the communication servers 16 and transmits a request to display aggregate transaction data. The management server 27 receives the request from the communication servers 16 and proceeds to display the requested data, as described below.

At processing block 605, a decision is made whether the user has any accounts eligible for real-time data management operations. In one embodiment, the management server 27 makes a determination whether the user has any accounts eligible for data management operations by reviewing the retrieved accounts. If the user does not have any eligible accounts, at processing block 606, the management server 27 transmits a message in a message window to the client 32 via the communication servers 16 and the network 34 and denies access to the data.

Otherwise, if the user has eligible accounts, at processing block 607, aggregate transaction data associated with the eligible accounts of the user is retrieved. In one embodiment, the management server 27 accesses the management database 28 and retrieves the aggregate transaction data associated with the eligible accounts of the user from the account tables 42 within the database 28.

Finally, at processing block 608, a report containing the aggregate transaction data is generated and displayed for the user. In one embodiment, the management server 27 generates a report containing the aggregate transaction data and transmits the report to the client 32 via the communication servers 16, the pages servers 12, and the network 34. The report is displayed for the user in a report window within a user interface area. The user interface area presented to the user facilitates user interaction and communications with the network-based facility 10, as described in further detail below in connection with FIGS. 7A-7D, 8, and 9.

Figure 7B:
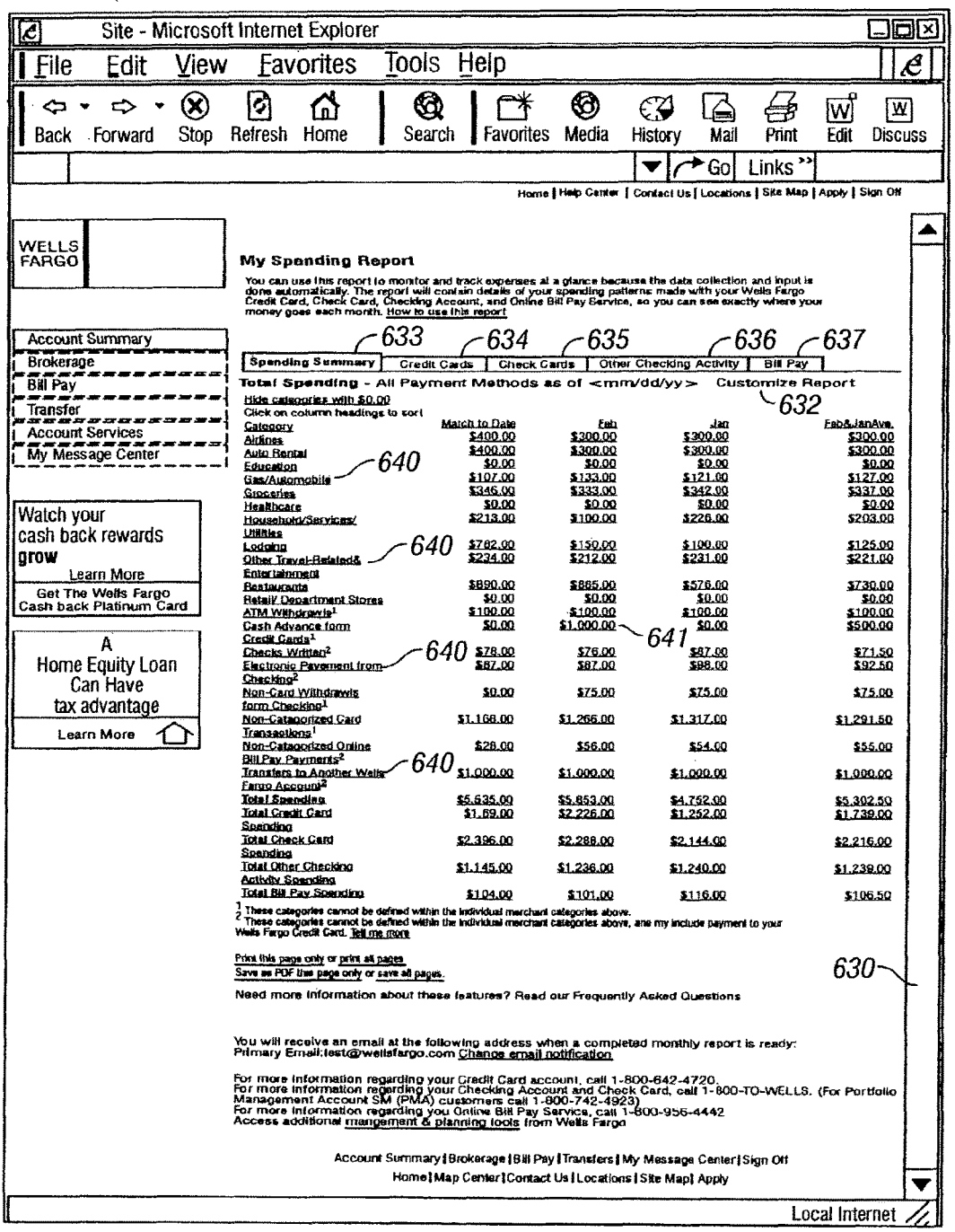

FIGS. 7A-7D illustrate exemplary interfaces for facilitating data management according to an exemplary embodiment. As illustrated in FIG. 7A, in one embodiment, the facility 10 displays a user interface area 610 in a window within the client machine 33 to facilitate communication of the request to display aggregate transaction information data for the user. The user interface area 610 includes a summary of accounts owned by the user, showing, for example, banking account numbers and balances, credit card account numbers and balances, loan account numbers and balances, and other financial information. The user interface area 610 further includes a link 611, which facilitates transmission of the request to the facility 10. The user selects the "View Spending Report" link 611 with a conventional mouse click command and the client machine 33 transmits the request to the management server 27 via the network 34 and the communication servers 16.

As illustrated in FIG. 7B, in one embodiment, the management server 27 displays the report in a user interface area 620. The user interface area 620 includes a report window 630, a number of command buttons, including, for example, a Customize Report button 632, and a number of window tabs, including a Spending Summary tab 633, a Credit Cards tab 634, a Check Cards tab 635, a Other Checking Activity tab 636, and a Bill Pay tab 637.

In one embodiment, if the Spending Summary tab 633 is activated with a conventional mouse click command, the report window 630 displays aggregate transaction data received from the management server 27. The aggregate transaction data are organized according to categories 640 stored in the category tables 46 within the management database 28. Each category 640 is an interactive link configured to facilitate further user interaction.

If the user activates one of the other tabs 634-637 with a conventional mouse click command, the report window 630 displays statements corresponding to respective credit card accounts, check card accounts, checking accounts, and/or bill pay accounts. As illustrated in FIG. 7D, if the user activates the Check Cards tab 635, for example, the report window 630 displays detailed individual check card transactions 650.

Figure 8:
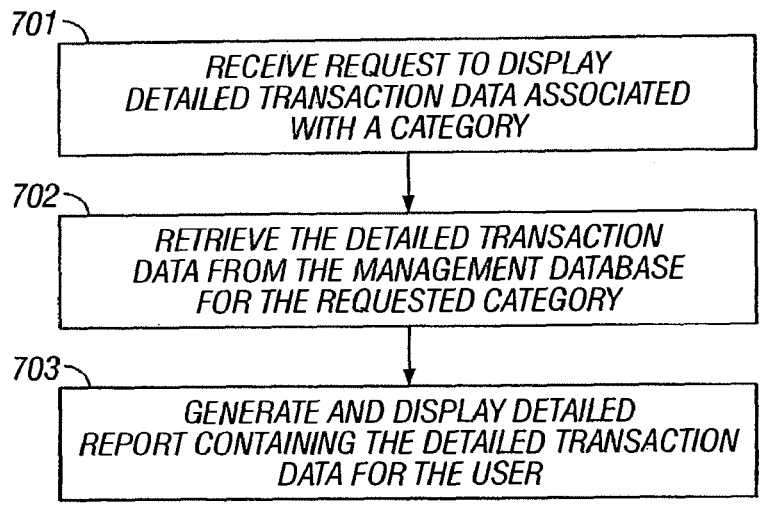
FIG. 8 is a flow diagram illustrating a method for facilitating display of detailed aggregate data according to an exemplary embodiment.

FIG. 8 is a flow diagram illustrating a method for facilitating display of detailed aggregate data according to an exemplary embodiment. As illustrated in FIG. 8, at processing block 701, a request to display detailed transaction data associated with a category is received. In one embodiment, referring also to FIG. 7B, the user selects an amount link 641 corresponding to a category 640 with a conventional mouse click command. Responsive to selection of the link 641, the client 32 transmits the request to display detailed transaction data associated with the category through the network 34 and the communication servers 16.

At processing block 702, the detailed transaction data for the requested category are retrieved from the management database 28. In one embodiment, the management server 27 receives the request from the client 32 and retrieves the detailed transaction data associated with the selected category from the account tables 42.

At processing block 703, a detailed report containing the detailed transaction data are generated and displayed for the user. In one embodiment, the management server 27 generates the detailed report containing the detailed transaction data and transmits the report to the client 32 via the communication servers 16, the pages servers 12, and the network 34. The detailed report is displayed for the user in a separate detailed report window (not shown) within the user interface area 620 shown in FIG. 7B.

Figure 9:
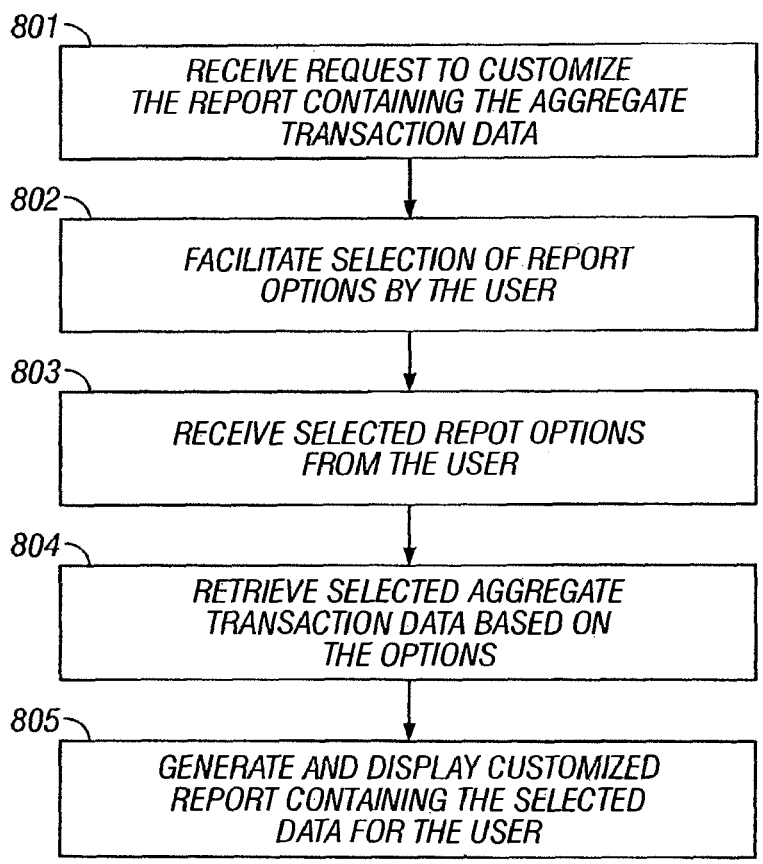
FIG. 9 is a flow diagram illustrating a method for facilitating customization of the aggregate data based on user input according to an exemplary embodiment.

FIG. 9 is a flow diagram illustrating a method for facilitating customization of the aggregate data based on user input according to an exemplary embodiment. As illustrated in FIG. 9, at processing block 801, a request to customize and display the report containing the aggregate transaction data is received. In one embodiment, referring also to FIG. 7B, the user selects the Customize Report link 632 with a conventional mouse click command. Responsive to selection of the link 632, the client 32 transmits the request to customize and display the report containing the aggregate transaction data through the network 34.

At processing block 802, the management server 27 facilitates selection of report options by the user. As illustrated in FIG. 7C, in one embodiment, subsequent to the receipt of the request to customize and display the report containing the aggregate transaction data, the management server 27 generates and displays an option window 660 in the user interface area 620. The option window 660 includes a number of customizing report options, such as, for example, a list of banking and/or credit card accounts 661, and facilitates selection by the user of one or more accounts that the user wants removed and/or added from the report containing the aggregate data.

Subsequent to selection of options with a conventional mouse click command, the client 32 transmits the selected options to the facility 10 via the network 34. At processing block 803, the management server 27 receives the selected report options transmitted by the client 32.

At processing block 804, selected aggregate transaction data are retrieved based on the report options. In one embodiment, the management server 27 applies the customizing report options to the current communication session with the client 32 and retrieves selected aggregate transaction data from the account tables 42 within the management database 28 based on the specific accounts selected by the user.

At processing block 805, a customized report containing the selected aggregate transaction data is generated and displayed for the user. In one embodiment, the management server 27 generates the customized report containing the selected data and transmits the report to the client 32 via the communication servers 16, the pages servers 12, and the network 34. The customized report is displayed for the user in a separate customized report window (not shown) within the user interface area 620 shown in FIG. 7B.

In an alternate embodiment, the option window 660 may include additional customizing report options to facilitate creation and display of various customized reports for the user. For example, the option window 660 may include a list of check card accounts, and/or other loan accounts associated with the user.

In another alternate embodiment, the option window 660 may facilitate user selection of an option to display detailed transactional information in its entirety over a significant period of time, such as, for example a rolling 13-month period of historical data. In yet another embodiment, the option window 660 may enable the user to compare a predetermined period of time from a current year with a similar period from a previous year, and produce profiles of financial expenditures, such as month-over-month, year-over-year, or year-to-date.

In another embodiment, the option window 660 may allow the user to save and retrieve report views, eliminating the need to recreate the report views during subsequent sessions. Users are given the option to save the customized report view as a default view, which then applies on a go-forward basis or until the user changes the selected report view. The management server 27 receives the saved customized report view and stores the report view as the default view in the management database 28.

In yet another embodiment, the option window 660 may enable the user to enter and save a budget amount for each predefined category 640 in order to track variances. The management server 27 receives the saved budget amounts and stores the budget amounts in connection with the respective categories 640 in the management database 28.

In yet another embodiment, the option window 660 may facilitate reclassification of individual transactions 650 to a different category 640, including past transactions stored in the database 28. The management server 27 may store the reclassified transactions in the database 28 and may also re-categorize the respective merchant/payee on a go-forward basis.

In yet another embodiment, the user interfaces 610 and 620, and the windows 630, 660, may include a link to other marketing or product-related sites of the facility 10 to facilitate user navigation to the respective sites.

In yet another embodiment, the option window 660 may enable the user to create custom categories 640 and to store the custom categories in the database 28 through the management server 27.

Figure 10:
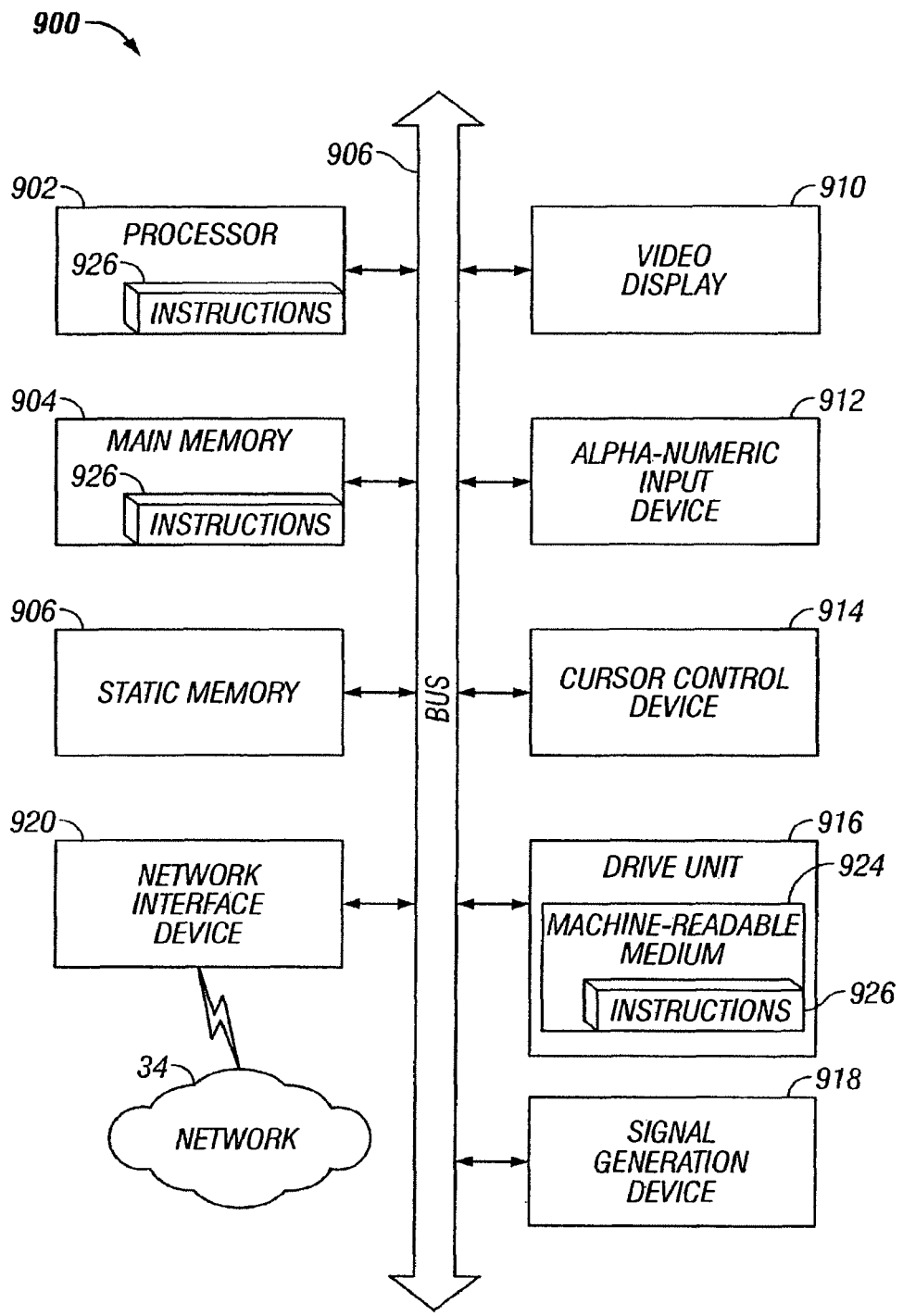
FIG. 10 is a diagrammatic representation of a machine in the exemplary form of a computer system within which a set of instructions may be executed.

FIG. 10 shows a diagrammatic representation of a machine in the exemplary form of a computer system 900 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a Web appliance or any machine capable of executing a sequence of instructions that specify actions to be taken by that machine.

The computer system 900 includes a processor 902, a main memory 904 and a static memory 906, which communicate with each other via a bus 908. The computer system 900 may further include a video display unit 910, e.g. a liquid crystal display (LCD) or a cathode ray tube (CRT). The computer system 900 also includes an alphanumeric input device 912, e.g., a keyboard, a cursor control device 914, e.g. a mouse, a disk drive unit 916, a signal generation device 918, e.g. a speaker, and a network interface device 920.

The disk drive unit 916 includes a machine-readable medium 924 on which is stored a set of instructions, i.e. software 926 embodying any one, or all, of the methodologies described above. The software 926 is also shown to reside, completely or at least partially, within the main memory 904 and/or within the processor 902. The software 926 may further be transmitted or received via the network interface device 920.

Figure 11:
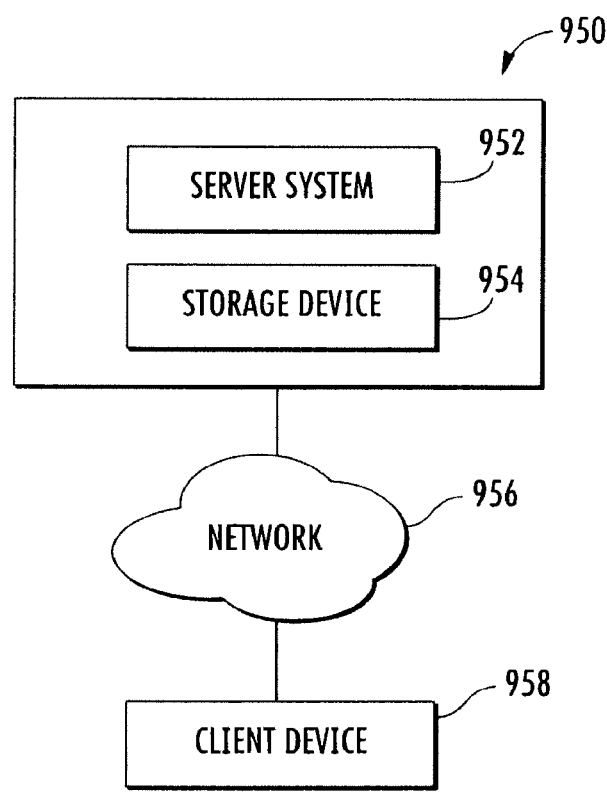
FIG. 11 is a block diagram of a financial management system according to an exemplary embodiment.

Referring now to FIG. 11, a system 950, such as a financial management system, is shown according to an exemplary embodiment, and may include a server system 952 (e.g., one or more servers, processors, computer logic or engine components, etc.) coupled to a storage device 954 (e.g., a memory, database, etc.). It should be understood that server system 952 and storage device 954 may include one or more servers and/or storage devices, respectively. System 950 is configured to provide financial management data to a client device 958 via a network 956. Server system 952 may include various types of logic configured to manage various types of data, including account management logic for managing various types of accounts associated with various users or account holders, processing logic configured to process transactions for the various bank accounts, and interface logic for connecting system 950 with user systems such as client device 958 and providing various user interfaces. Storage device 954 is configured to store financial data for a number of different user accounts, such as a checking account, a credit card account, etc., and facilitate retrieval and usage of such data by server system 952. In one embodiment, the accounts may all be associated with a single financial institution. In other embodiments, the accounts may be associated with two or more different financial institutions. Network 956 may include a wide variety of wired and/or wireless networks (e.g., the Internet, etc.) as also discussed further herein. Further, client device 958 may include any of a number of devices such as desktop computers, laptop computers, handheld computers (e.g., personal digital assistants (PDAs), smart phones, etc.), and so on.

Figure 12:
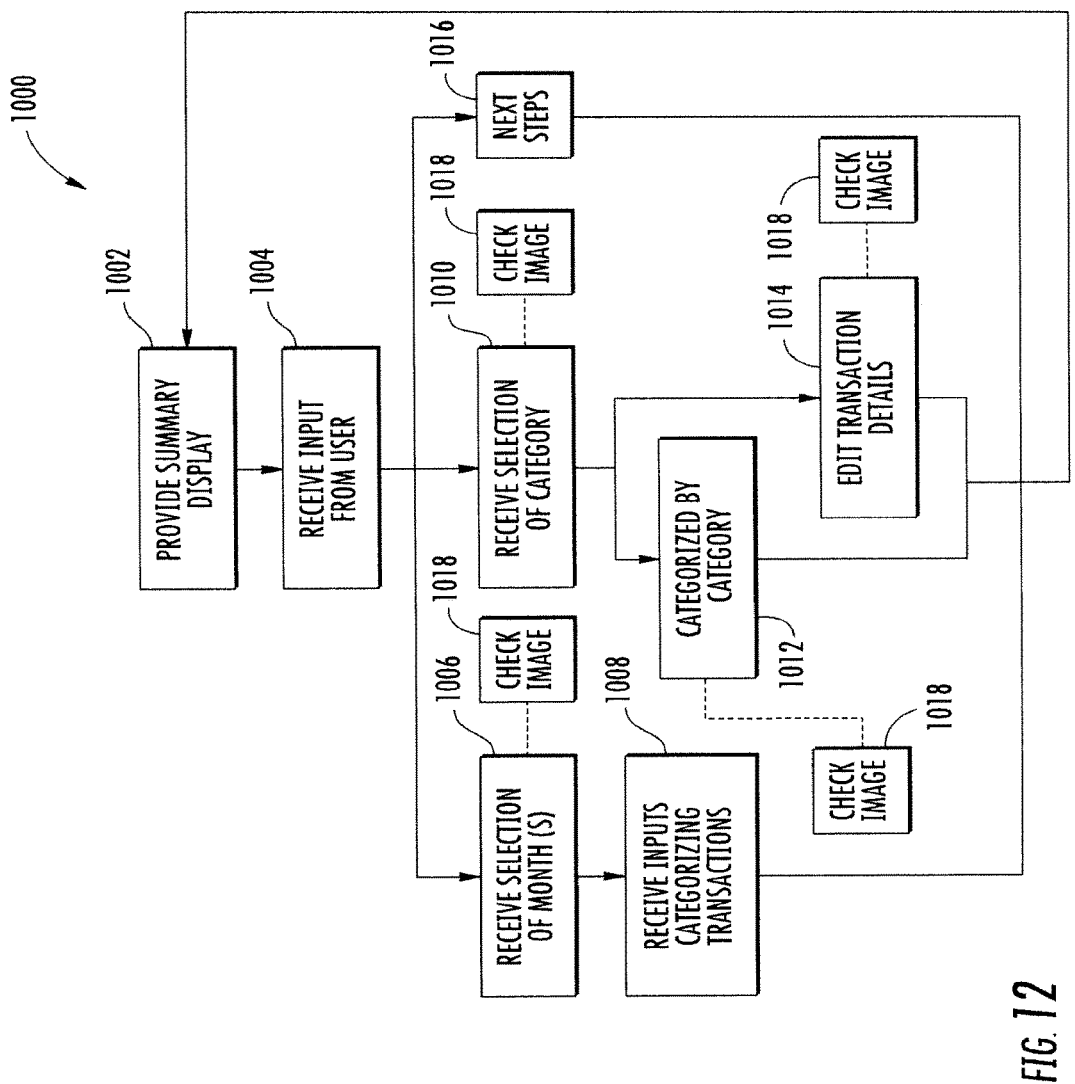
FIG. 12 illustrates a method of providing financial data to a user according to an exemplary embodiment.

Referring to FIG. 12, a block diagram of a method of managing financial data is shown according to an exemplary embodiment. At step 1002, system 950 (or, similarly, facility 10) may provide a user with a user interface 1050 ("My Spending Report"), an exemplary embodiment of which is shown in FIG. 13. User interface 1050 may be a spending or cash flow report or summary that indicates spending and/or savings amounts for a user over various time periods, including past time periods (e.g., the past 2 months, etc.) and current or "to date" periods (e.g., month-to-date time, year-to-date, etc.).

As shown in FIG. 13, user interface 1050 may display a number of transaction categories such as merchant categories 1052 (e.g., merchant or vendor categories, etc.) into which data for various transaction data may be categorized by system 950. For each merchant category 1052, system 950 may provide a current cash flow amount 1056 (e.g., a month-to-date cash flow amount, etc.), cash flow amounts 1058, 1060 for previous time periods (e.g., for the previous 2 months, etc.), and an average cash flow amount 1062 over a time period (e.g., 12 months). In an exemplary embodiment, system 950 may be configured to categorize any transactions that cannot be categorized by one of merchant categories 1052 by a transaction type 1054 (e.g., a transaction code, payment method, etc.) that represents the type of transaction or payment method, such as an ATM withdrawal, a credit card cash advance, a check written, etc. In some embodiments, categorization of transactions into transaction type or payment method may consist of maintaining the transactions segregated by type as the data is received (e.g., via receipt of credit card transaction data, check transaction data, ATM transaction data, etc.).

Referring back to FIG. 12, while viewing user interface 1050, a user may provide various inputs and make various selections, including selecting one or more links that direct the user to other user interfaces. Referring to FIGS. 12-13, at step 1004, system 950 may receive an input from the user. Among others, the input may be a selection of a link 1066 associated with a field having data for one of merchant categories 1052, a selection of a link 1064 ("Categorize Now") to categorize uncategorized transactions (e.g., those transactions categorized only by transaction type 1054), and/or a selection of one or more links 1070, 1072, 1074 within a module 1068 (e.g. a "next steps module" or display area or portion including links to additional information, resources, user interfaces, etc.). Further, user interface 1050 may include one or more additional links 1076 that direct a user to other user interfaces provided by system 950 (e.g., user interfaces associated with debt repayment, personal loans, etc.).

Referring to FIGS. 12-14, at step 1006, should a user select link 1064 ("Categorize Now") shown in FIG. 13, system 950 may direct the user to a user interface 1100 ("Categorize Transactions: Step 1"), an exemplary embodiment of which is shown in FIG. 14. As shown in FIG. 14, user interface 1100 may display a number of time periods 1102 (e.g., months, years, etc.). In order to facilitate categorization of the transactions, a user is provided with the opportunity to select one or more time periods for which to categorize transactions. This may enable a user to categorize only desired time periods, and/or may make the task of categorizing large numbers of transactions more manageable. As shown in FIG. 14, a user is provided with three months from which to select (corresponding to the current and past two months displayed in FIG. 13), although according to various alternative embodiments, other numbers and lengths of time periods may be utilized. A user may select one or more of the time periods 1102 shown, and then select option 1104 ("Continue").

According to an exemplary embodiment, upon a user selecting option 1104 shown in FIG. 14, a user may be directed to a user interface 1150 ("Categorize Transactions: Step 2"), an exemplary embodiment of which is shown in FIG. 15. As shown in FIG. 15, user interface 1150 may provide the user with the ability to categorize individual transactions 1152 by using menu 1154. Menu 1154 may provide the user with various categories similar to merchant categories 1052 and transaction type categories 1054 shown in FIG. 13. For each transaction 1152, the user may select a category from menu 1154. User interface 1150 enables a user to categorize transactions by merchant categories 1052 that would otherwise only be categorized by transaction type categories 1054.

Figure 19:
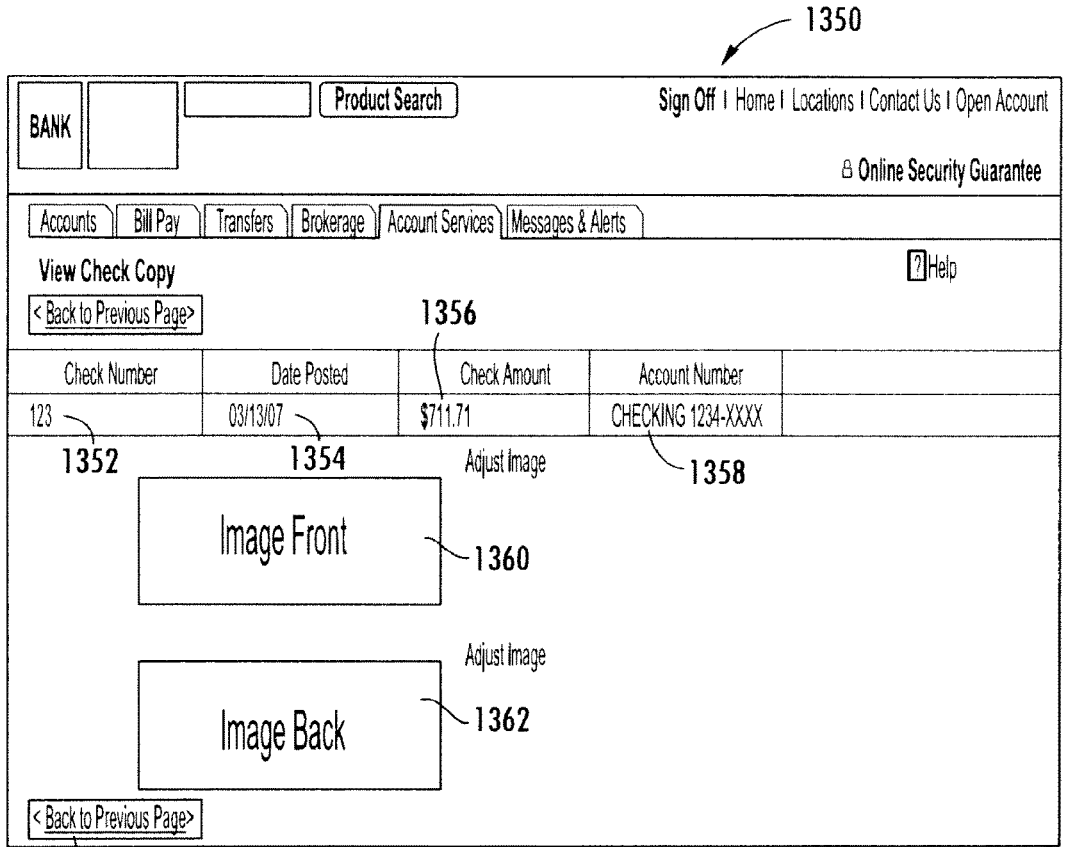

According to an exemplary embodiment, an option 1156 ("View") may be provided with any transactions 1152 involving a check (e.g., a personal check written by a user). Upon a user selecting option 1156, the user may be directed to a user interface 1350 (step 1018 shown in FIG. 12), an exemplary embodiment of which is shown in FIG. 19. As shown in FIG. 19, user interface 1350 ("View Check Copy") may identify a check number 1352, a date posted 1354, a check amount 1356, and an account number 1358. Further, user interface 1350 may provide a front image 1360 and a rear or back image 1362 of the actual check. According to an exemplary embodiment, images 1360, 1362 are electronic images generated by a document scanning process utilizing an actual written check (or a copy thereof). Images 1360, 1362 may include information typically found on checks, including a date, an identification of to whom the check was written, an amount, a bank and corresponding account number, and so on. Providing images 1360, 1362 enables the user to identify to whom the check was written, which may assist in categorizing the transaction. Such information may not otherwise be available for check transactions (as it is with, for example, credit card transactions, where the merchant or vendor name is typically available as part of the electronic transaction data). Upon a user viewing images 1360, 1362, the user may select option 1364 to be directed to the previous user interface the user was viewing (e.g., user interface 1150 shown in FIG. 15).

Referring again to FIG. 15, once a user is finished categorizing the various transactions 1152, a user may select option 1158 ("Submit") in order to submit the categorizations to system 950. System 950 then may incorporate the newly categorized transactions into subsequent user interfaces, such as the spending summary shown in user interface 1050 (see FIG. 12).

Figure 16:
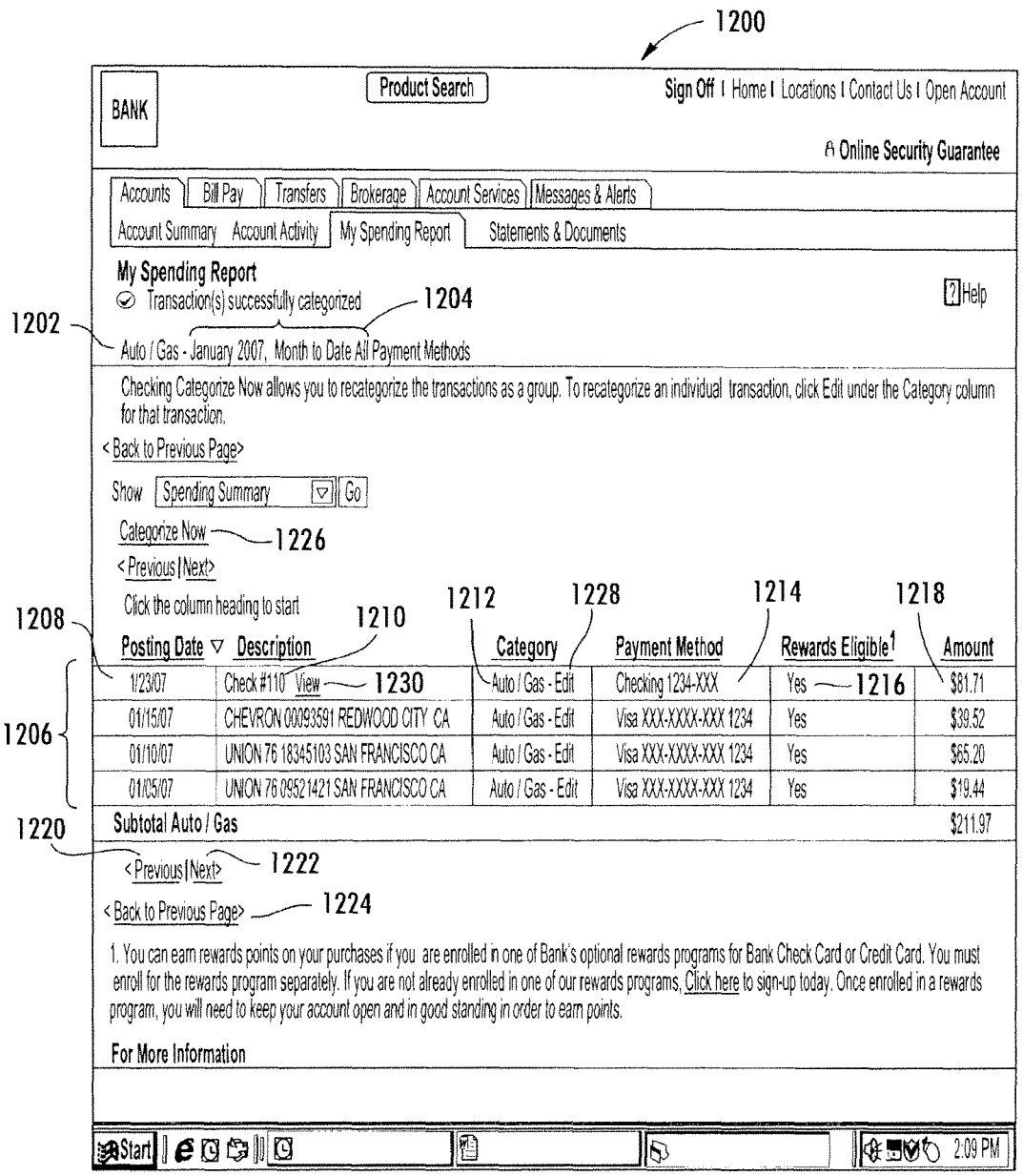

Referring now to FIGS. 12-13 and 16-18, according to an exemplary embodiment, system 950 may enable a user to recategorize one or more transactions within merchant categories 1052 shown in FIG. 13. For example, should a user wish to recategorize one or more transactions within a specific merchant category 1052, the user may select an option 1066 (step 1010 shown in FIG. 12), which is associated with a single merchant category 1052 (e.g., Auto/Gas, etc.). Upon the user selecting option 1066, system 950 directs the user to a user interface 1200 ("Auto/Gas— January 2007"), an exemplary embodiment of which is shown in FIG. 16.

As shown in FIG. 16, user interface 1200 may provide a user with details regarding a specific merchant category (e.g., Auto/Gas). According to an exemplary embodiment, user interface 1200 may include a category identifier 1202, a date range 1204, and transaction details for a number of transactions 1206, including, for each transaction, a posting date 1208, a description 1210, a category 1212, a payment method 1214, an indication 1216 of whether the transaction is rewards eligible, and an amount 1218. User interface enables a user to recategorize transactions either as a group or individually. For example, should a user desire to recategorize the entire group of transactions within a merchant category, the user may select an option 1226 ("Categorize Now"). Alternatively, should a user wish to recategorize an individual transaction, the user may select an option 1228 ("Edit"). As shown in FIG. 16, for each transaction, option 1228 is provided adjacent each category 1212, enabling the user to select individual transactions 1206 to recategorize.

Should a user select option 1226 ("Categorize Now"), system 950 may direct the user to a user interface 1250 (step 1012 shown in FIG. 12), an exemplary embodiment of which is shown in FIG. 17. As discussed with respect to FIG. 16, user interface 1250 ("Categorize Transactions") permits a user to recategorize an entire group of transactions within a merchant category. As shown in FIG. 17, user interface 1250 may provide transaction details for a number of transactions 1252 including, for each transaction, a posting date 1254, a description 1256, a payment method 1258, an amount 1260, and a category 1262. For each transaction 1252, a menu 1264 of merchant categories may be provided to the user, such that a user may select a merchant category to recategorize each of transactions 1252. As discussed in further detail above, an option 1266 ("View") may be provided as part of user interface 1250 to enable a user to view an image of a written check such as that shown in FIG. 19. Upon a user completing any desired recategorization, the user may select option 1268 ("Submit") to submit the recategorization to system 950, upon which system 950 may update any subsequent user interfaces with the recategorized data.

Should a user select option 1228 ("Edit"), system 950 may direct the user to a user interface 1300 (step 1014 shown in FIG. 12), an exemplary embodiment of which is shown in FIG. 18. User interface 1300 ("Edit Transaction Details") enables a user to recategorize an individual transaction within a category. User interface 1300 includes much of the same information as user interface 1250, including, for a transaction 1302, a posting date 1304, a description 1306, a payment method 1308, an amount 1310, and a category 1312. Furthermore, menu 1314 and option 1316 ("View") enable a user to recategorize the transaction and/or view a check image associated with the transaction, as similarly discussed with respect to FIG. 17. Upon a user completing any desired recategorization, a user may select option 1318 ("Submit") to submit the recategorization to system 950, upon which system 950 may update any subsequent user interfaces with the recategorized data.

Referring further to FIG. 16, one or more of transactions 1206 may include a check transaction. In order to facilitate recategorization of any check transactions, an option 1230 ("View") may be provided as part of any check transactions. According to an exemplary embodiment, should a user select option 1230, system 950 may direct the user to interface 1350 shown in FIG. 19. As discussed in further detail above, user interface 1350 provides the user with images 1360, 1362 of the written check such that the user may identify to whom the check was written in order to assist in categorization of the transaction.

In some embodiments, after a user categorizes and/or recategorizes one or more transactions, system 950 may be configured to automatically categorize historical and/or future transactions accordingly. For example, should a user categorize a credit card transaction from a particular merchant under the category "Auto/Gas," system 950 may be configured to recategorize any past or future transactions with that merchant under "Auto/Gas." According to one embodiment, a user may select whether to recategorize none, one, or both of past and/or future transactions. Furthermore, recategorizations may be based on vendors or merchants (e.g., merchant categories), independent from the transaction type or payment method, such that all transactions, regardless of the payment method, may be recategorized by recategorizing a single transaction. Alternatively, system 950 may be configured such that recategorizations are dependent upon both the vendor or merchant and the payment method, such that recategorizing, for example, a credit card transaction with a particular merchant will only recategorize other credit card transactions with that specific merchant. In some embodiments, users may configure how a recategorization of one or more transactions impacts the categorization and/or recategorization of additional transactions. Furthermore, in some alternative embodiments, users may be provided with the ability to define or create custom categories (e.g., by vendor or merchant, payment method, description, etc.).

Referring again to FIGS. 12-13, as discussed above, user interface 1050 may include a module or display portion 1068 having links 1070, 1072, 1074. Links 1070, 1072, 1074 may direct a user to other user interfaces having additional useful information and/or financial tools available to the user. For example, as shown in FIG. 13, link 1070 ("My Budget Plan") may direct the user to a user interface that facilitates creation of a customized budget plan for a user, link 1072 ("Take a Tour") may direct the user to a user interface that provides information about various additional resources available to the user, and link 1074 ("Tools and Calculators") may direct the user to a one or more user interfaces that include various financial tools and calculators.

According to an exemplary embodiment, links 1070, 1072, 1074 provided as part of module 1068 may be a subset or portion of a larger group or set of options or links that may be provided to a user. For example, according to various exemplary embodiments, the links that may be available to a user via module 1068 may include one or more links that enable a consumer to view a savings plan (e.g., for users with an established savings plan), create a savings plan (e.g., for users without an established savings plan), consolidate a user's accounts, obtain debt pay-down information (e.g., for users with a personal loan), obtain free alerts, obtain information on business payment options (e.g., for a business user with no on-line bill payment services), and so on. A variety of other information may be provided to users via module 1068 and may be customized to the user, such as information on spending plans, budget plans, etc.

In some embodiments, the links that are displayed to a user via module 1068 are selected from a larger group in order to customize module 1068 to the specific user. For example, the links provided as part of module 1068 may be selected based on a variety of data (e.g., customization criteria, etc.) related to the user, including, but not limited to, what accounts a user may currently have open with a particular financial institution (e.g., such that information regarding opening a new savings account is only provided to users that do not yet have a savings account with the particular financial institution, etc.), whether the user typically has a surplus or deficit of funds (e.g., such that information regarding how to invest surplus funds and/or decrease spending/increase savings may be provided to the user as appropriate, etc.), whether the user has requested specific information (e.g., via a user profile or questionnaire, etc., such that if a user has requested particular information, such as information regarding 401(k) savings plans, etc., appropriate information is provided to the user), and so on. Providing a customized module such as module 1068 is intended to provide users with links relevant to and targeted at the individual user.

It should be understood that the various embodiments discussed herein may be used individually or in any suitable combinations. All such configurations are intended to be within the scope of the present disclosure.

It is to be further understood that embodiments described herein may be used as or to support software programs executed upon some form of processing core (such as the CPU of a computer) or otherwise implemented or realized upon or within a machine or computer readable medium. A machine readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, e.g. carrier waves, infrared signals, digital signals, etc.; or any other type of media suitable for storing or transmitting information.

In the foregoing specification, the subject matter of this disclosure has been described with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense.

What is claimed is:

1. A computer-implemented system for customized management of financial transactions, the system comprising:
   a processor and program logic stored in memory and executable by the processor, the program logic configured to:
   manage bank accounts respectively associated with a plurality of account holders for a bank and process transactions for the bank accounts;
   provide a display of a plurality of categories wherein the transactions are categorized into the plurality of categories, the plurality of categories including at least merchant categories and payment type categories;
   provide a first link selectable to enable an account holder to categorize at least one of the transactions; and
   provide at least one second link, the at least one second link being selectable to direct the account holder to financial tools available through the bank, the at least one second link being selected for display based on at least one customization criteria;
   wherein the at least one customization criteria includes at least one of (i) whether the account holder has an active spending plan with the bank, (ii) whether the account holder typically has a positive total monthly cash flow, and (iii) whether the account holder has an active budget plan with the bank.

2. The system of claim 1, wherein the at least one customization criteria is associated with the bank and the account holder.

3. The system of claim 2, wherein the at least one customization criteria includes whether the account holder has an active spending plan with the bank, and the selectable link directs the account holder to a user interface configured to enable the account holder to set up a spending plan.

4. The system of claim 2, wherein the at least one customization criteria includes whether the account holder typically has a positive total monthly cash flow, and the selectable link directs the account holder to a user interface configured to provide the account holder with options regarding investment of any surplus cash flow.

5. The system of claim 2, wherein the at least one customization criteria includes whether the account holder has an active budget plan with the bank, and the selectable link directs the account holder to a user interface configured to enable the account holder to set up a budget plan.

6. The system of claim 1, wherein the transactions include credit card transactions and check transactions.

7. The system of claim 1, wherein the categories include merchant categories and payment method categories.

* * * * *